(12) United States Patent
Hobson et al.

(10) Patent No.: US 6,557,920 B1
(45) Date of Patent: May 6, 2003

(54) SUN VISOR ASSEMBLY HAVING A FLEXIBLE EAR

(75) Inventors: James Jud Hobson, Jonesville, MI (US); Jeffrey L. Beaver, Indianapolis, IN (US)

(73) Assignee: Crotty Corporation, Qunicy, MI (US)

( * ) Notice: Subject to any disclaimer, the term of this patent is extended or adjusted under 35 U.S.C. 154(b) by 0 days.

(21) Appl. No.: 10/095,812

(22) Filed: Mar. 12, 2002

(51) Int. Cl.[7] .................................................. B60J 3/00
(52) U.S. Cl. ...................................................... 296/97.1
(58) Field of Search .............................. 296/97.1, 97.6, 296/97.8

(56) References Cited

U.S. PATENT DOCUMENTS

| | | | | |
|---|---|---|---|---|
| 5,031,951 A | * | 7/1991 | Binish | 296/97.1 |
| 5,131,711 A | * | 7/1992 | Laferle | 296/97.1 |
| 5,887,933 A | * | 3/1999 | Peterson | 296/97.1 |
| 5,984,399 A | * | 11/1999 | Viertel et al. | 296/97.1 |
| 6,033,005 A | * | 3/2000 | Crotty, III | 296/97.1 |
| 6,302,467 B1 | * | 10/2001 | Crotty et al. | 296/97.1 |

* cited by examiner

*Primary Examiner*—D. Glenn Dayoan
*Assistant Examiner*—Jason Morrow
(74) *Attorney, Agent, or Firm*—Rader, Fishman & Grauer, PLLC (57) ABSTRACT

A sun visor assembly is provided that includes a foundation having first and second foundation halves and a periphery that defines at least a portion of an edge of the sun visor. A first ear portion attached to the first foundation half and a second ear portion attached to the second foundation half. The first and second ear portions are secured together during assembly to form an ear, wherein at least a portion of the ear is capable of movement relative to the foundation. In one embodiment, the foundation is folded unto itself to form the first and second foundation halves. In an alternate embodiment, the foundation includes two discrete foundation halves that are secured together during assembly of the sun visor. At least a portion of the periphery of the foundation includes a rounded edge having a substantially semicircular cross-section.

29 Claims, 10 Drawing Sheets

SUN VISOR ASSEMBLY HAVING A FLEXIBLE EAR

BACKGROUND OF THE INVENTION

1. Field of the Invention

The present invention relates generally to sun visors for vehicles and, more particularly, to sun visors having a flexible ear.

2. Description of the Related Art

It is well known to provide a sun visor for the windshield of a vehicle, wherein the sun visor is mounted on a roof panel of the vehicle for movement between a stored position adjacent the vehicle headliner, a first use position adjacent the windshield, and a second use position adjacent a sidedoor window opening. It is also common to permit a portion of the sun visor body, known as the ear, to bend against the contour of the vehicle headliner, as the sun visor is turned upward to its stored position.

In one known sun visor assembly, a molded plastic or pressed wood core is used to establish a base upon which various components of the sun visor are constructed. Kraft paper or thin cardboard is typically folded over the plastic or pressed wood core, which forms a relatively flat foundation upon which is glued a decorative cover material. The ear of the sun visor is typically formed using matching shaped portions of the foundation.

One technique is to create a fold line in the foundation to allow the ear to flex relative to the remaining foundation. A fold line is typically formed in the foundation by creating one or more perforated lines in the kraft paper or thin cardboard between the ear and the remainder of the foundation. A limitation of this technique is that the ear portions tend to break free from the foundation in use, leaving the ear limply supported by the decorative cover material. Another limitation of this technique is that the edge of the sun visor assembly undesirably exhibits a substantially flat, bifurcated shape that is formed when the relatively flat foundation halves are secured together. This limitation renders the described sun visor unusable in certain automotive applications that require that the contactable edges of the sun visor to have a radius of not less than 3.2 mm for occupant safety.

Another known sun visor assembly uses a molded plastic foundation instead of kraft paper or cardboard. In order to impart flexibility in the ear of the plastic foundation, a hinge is typically disposed between the ear and the remainder of the foundation. A limitation of this technique is that the hinge adds complexity and expense to the manufacture of the sun visor assembly.

SUMMARY OF THE INVENTION

A sun visor assembly is provided that includes a foundation having first and second foundation halves and a periphery that defines at least a portion of an edge of the sun visor. The sun visor assembly includes a first ear portion attached to the first foundation half and a second ear portion attached to the second foundation half. The first and second ear portions are secured together during assembly of the sun visor to form an ear that is capable of movement relative to the foundation.

In one embodiment of the present invention, the foundation is folded unto itself to form the first and second foundation halves. One of the foundation halves includes a portion that is fixedly attached to the first ear portion. The other foundation half includes a portion that is slidably attached to the second ear portion. A bead member is secured to the periphery of the foundation and forms a rounded edge whose surface is substantially semi-circular in cross section and faces away from the sun visor. The first and second ear portions each include a bulbous portion whose surfaces cooperate to form a rounded edge. The rounded edge exhibits a substantially semi-circular cross section having a radius substantially similar to that of the rounded edge of the bead member.

In another embodiment of the present invention, the foundation includes two discrete foundation halves that are secured together during assembly of the sun visor. At least a portion of the periphery of each foundation half includes an integrally formed, rounded lip portion. The lip portions cooperate to form a rounded edge portion having a substantially semi-circular cross-section. Similarly, the periphery of the first and second ear portions each includes a rounded lip portion. Upon assembly, the lip portions of the ear cooperate to form a rounded edge having a radius substantially similar to the rounded edge of the foundation.

Among other advantages, the present invention provides a sun visor assembly having a flexible ear and a rounded periphery that meets or exceeds vehicle occupant safety standards of certain automotive manufacturers, unlike the prior art. More particularly, the present invention advantageously provides a sun visor having a substantially flat foundation, a flexible ear and a rounded periphery that meets or exceeds occupant safety standards of automotive manufacturers. Additionally, the present invention advantageously provides a sun visor assembly having a rigid foundation with a flexible ear portion and a rounded periphery that meets or exceeds occupant safety standards of automotive manufacturers.

DESCRIPTION OF THE PREFERRED EMBODIMENTS

Figure 1:
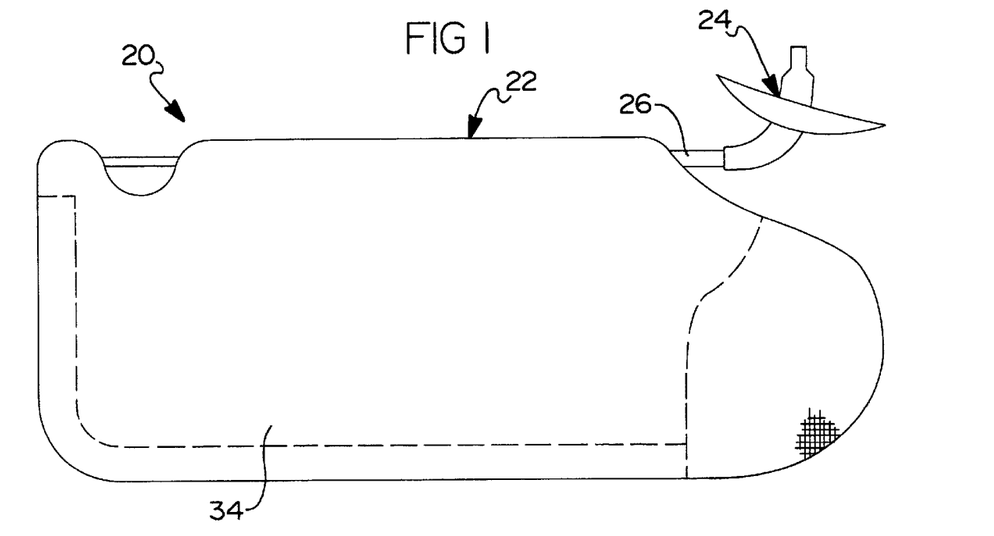
FIG. 1 is a front elevational view of a sun visor assembly according to the present invention.

Referring now to the drawings, the preferred embodiments of the present invention are shown in detail. Referring to FIG. 1, there is shown a sun visor assembly 20 that generally includes a sun visor body 22 that is operably connected to a vehicle (not illustrated) by a mounting bracket assembly 24. Mounting bracket assembly 24 secures sun visor 20 to a vehicle roof panel and/or headliner and permits sun visor 20 to be pivoted about a substantially vertical axis from a stored position proximate the front windshield to a first use position proximate a side window. Sun visor 20 is rotatably supported on a visor shaft 26 extending from mounting bracket assembly 24 such that sun visor 20 may be pivoted about a substantially horizontal axis between the stored position and a second use position adjacent the front windshield.

Figure 2:
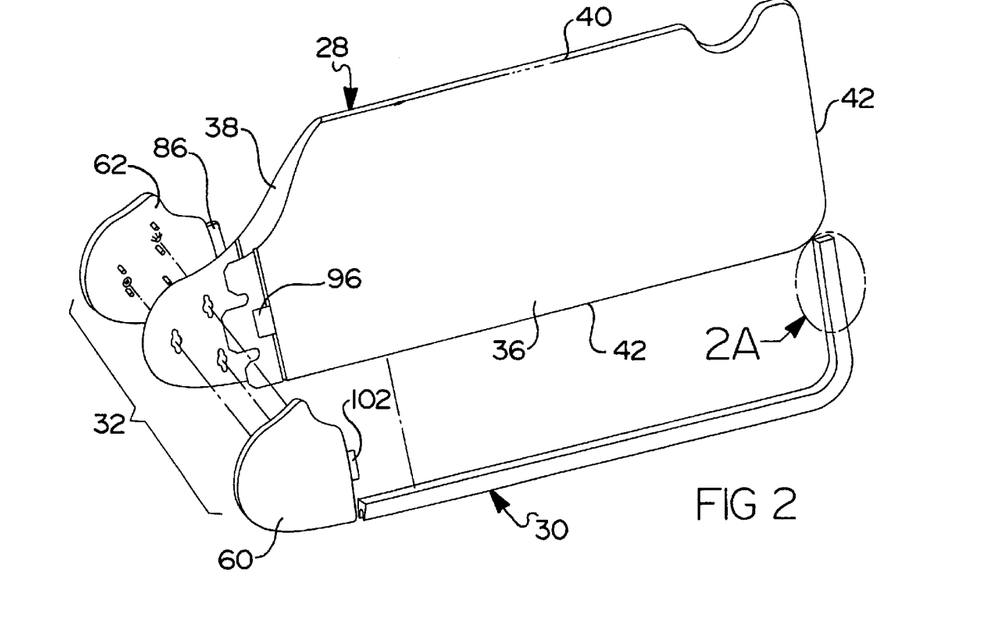
FIG. 2 is an exploded perspective view of a sun visor foundation, ear and bead member according to an embodiment of the present invention.

Referring to FIG. 2, a portion of sun visor body 22, according to an embodiment of the present invention, is shown in detail. In this embodiment, sun visor body 22 includes a foundation 28, a rounded bead member 30, an ear 32 and an upholstery cover 34 (shown in FIG. 1) extending over and substantially covering foundation 28, bead member 30 and ear 32. As illustrated in FIG. 2, foundation 28 is preferably formed of one butterfly-like piece of self-supporting material, such as kraft paper or thin cardboard. Foundation 28 is preferably prepared by die cutting or stamping the shape of foundation 28. Foundation 28 is then folded unto itself about one or more crease lines (generally denoted by element number 40 in FIG. 2) to form two foundation halves 36 and 38. The crease lines 40 provide a living hinge to facilitate folding of foundation 28 during assembly of sun visor 20. While foundation 28 is preferably described as having a butterfly-like structure, it will be appreciated that foundation 28 may comprise two discreet halves that are joined together during assembly. Moreover, in addition to kraft paper and cardboard, foundation 28 may comprise other self-supporting materials including, but not limited to, plastic and hardboard.

Referring to FIGS. 1 and 2, bead member 30 is attached to at least a portion of a periphery 42 of foundation 28. When attached to foundation 28, bead member 30 creates a rounded edge whose surface exhibits a substantially semi-circular cross-section that faces away from sun visor 20. The rounded edge advantageously overcomes the substantially non-rounded, bifurcated shape of the periphery of prior art sun visors. Bead member 30 may include two separate pieces that are individually secured to each half of foundation 28, or a single rounded member secured to a core member; both of which are disclosed and described in U.S. Pat. No. 6,302,467, which is owned by the assignee of the present invention and is hereby incorporated by reference in its entirety.

Figure 2A:
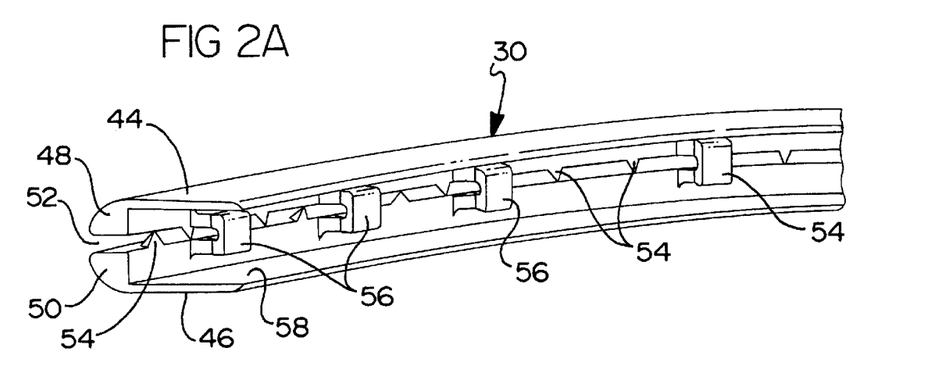
FIG. 2A is a detailed perspective view of a bead member as illustrated in FIG. 2.
Figure 2B:
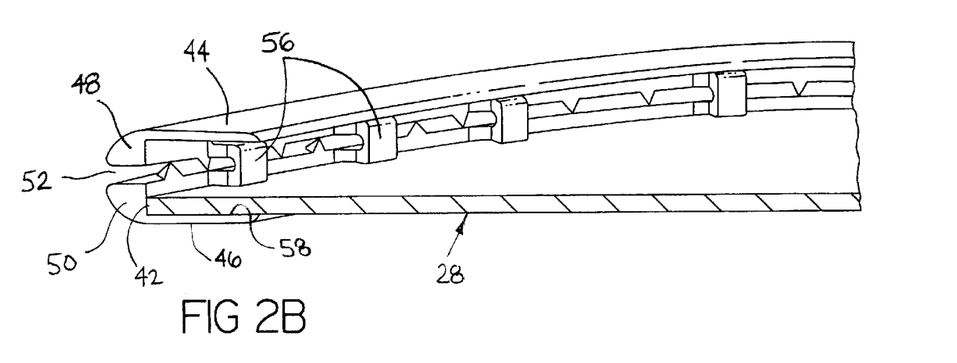
FIG. 2B is a detailed perspective view of the bead member of FIG. 2A secured to one of the foundation halves illustrated in FIG. 2.

Alternatively, as illustrated in FIGS. 2A and 2B, bead member 30 is a single molded polymeric piece that is secured to periphery 42 of foundation 28. In this embodiment, bead member 30 includes two integrally formed halves 44 and 46, each having a substantially symmetrical bulbous portion 48 and 50, respectively. As will be appreciated with reference to FIGS. 2A and 2B, the outer surfaces of bulbous portions 48 and 50, when combined, exhibit a substantially semi-circular cross-section that faces away from sun visor 20, such that an edge of sun visor 20 forms a radius. It is preferable that the radius of the outer surfaces of bulbous portions 48, 50 are at least 3.2 mm and, more preferably, at least 3.5 mm. These dimensions advantageously permit bead member 30 to satisfy vehicle occupant safety standards and regulations promulgated by international authorities in the automotive industry.

Bulbous portions 48 and 50 are separated by a gap 52 so that cover 34 can be tucked between halves 44 and 46 during assembly. To facilitate retention of cover 34 between bulbous portions 48 and 50, a plurality of teeth 54 are integrally formed with and extend away from each bulbous portion 48, 50 to grip cover 34 therebetween. Teeth 54 are preferably offset from one another to adequately secure cover 34 as it is stretched over halves 44 and 46 during assembly.

A plurality of substantially U-shaped connector ribs 56 expandably connect the two halves 44, 46 of bead member 30. Connector ribs 56 maintain the uniformity of gap 52 along the rounded edge of bead member 30 and allow halves 44, 46 to expand as cover 34 is tucked between halves 44, 46 during assembly. Connector ribs 56 also function to retain bead member 30 on foundation 28, as illustrated in FIG. 2B, by sandwiching peripheral edge 42 of foundation 28 between connector ribs 56 and an inside surface 58 of bead member halves 44, 46. The resiliency of connector ribs 56 acts to grip foundation halves 36, 38 after assembly. Advantageously, bead member 30 may be used on either a right-hand or a left-hand sun visor interchangeably.

Figure 3:
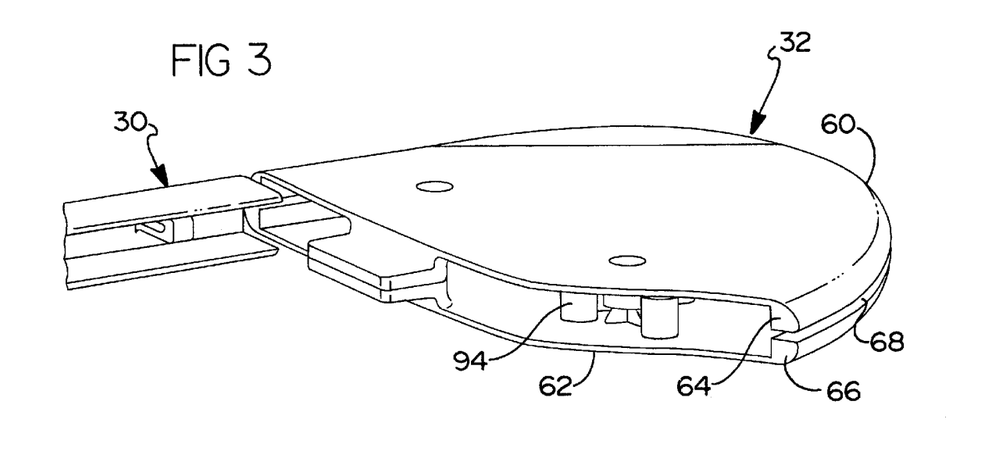
FIG. 3 is a perspective view of the sun visor ear and bead member of FIG. 2.
Figure 3A:
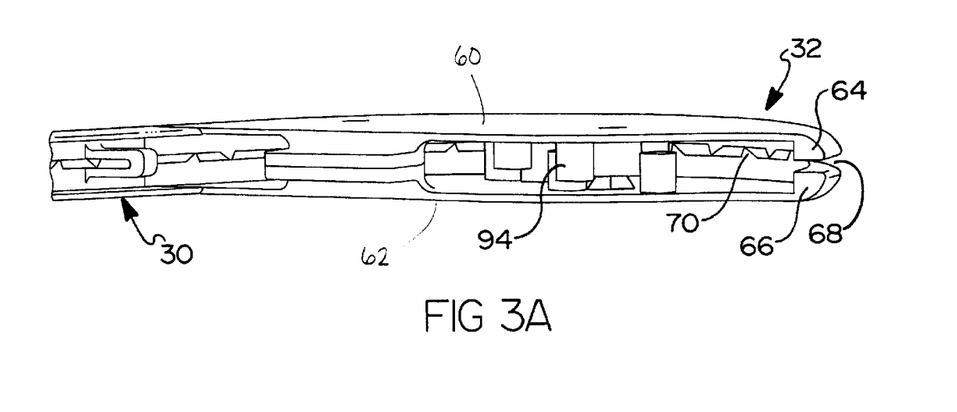
FIG. 3A is another perspective of the sun visor ear of FIG. 3.

As illustrated in FIGS. 1 and 2, ear 32 is provided on the portion of sun visor body 22 that bends when sun visor 20 is turned upward to its stored position against the vehicle headliner. Ear 32 is preferably made of a polymeric material, such as ABS or other suitable plastic, but may include other materials, such as metal. Referring to FIGS. 3 and 3A, ear 32 preferably includes two separate ear portions 60 and 62, each having a substantially symmetrical bulbous portion 64 and 66, respectively, that cooperate to form an edge of ear 32. The outer surfaces of bulbous portions 64 and 66, when combined, define a substantially semi-circular cross-section that faces away from sun visor 20, such that an edge of ear 32 forms a radius. Like bead member 30 described above, it is preferable that the edge radius of bulbous portions 64, 66 is at least 3.2 mm and, more preferably, at least 3.5 mm.

Referring still to FIGS. 3 and 3A, bulbous portions 64, 66 of ear 32 are separated by a gap 68 so that cover 34 can be tucked between halves 60, 62 during assembly. To facilitate retention of cover 34 between bulbous portions 64 and 66, a plurality of teeth 70 are integrally formed with and extend away from each bulbous portion 64, 66 to grip cover 34 therebetween. Teeth 70 ate preferably offset from one another to adequately secure cover 34 as it is stretched over ear portions 60, 62 during assembly.

Figure 6:
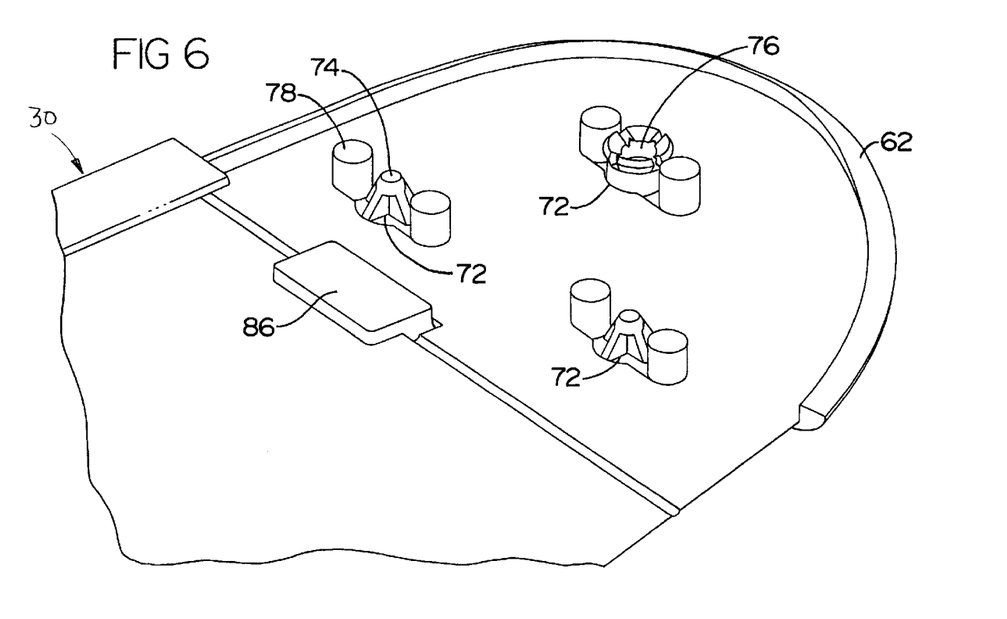
FIG. 6 is a perspective view of the foundation half of FIG. 4 mated with a first ear portion.

Referring to FIG. 6, ear portions 60, 62 preferably include at least one integrally formed fastener 72 that is configured to secure ear portions 60, 62 together given a simple movement of one ear portion 60, 62 toward the other. In a preferred embodiment, fastener 72 includes a male fastener portion 74, which is disposed on one ear portion 60, 62, and a corresponding female fastener portion 76 disposed on the other ear portion. Depending on the size of ear 32, each ear portion 60, 62 may include several fasteners 72. Additionally, each ear portion 60, 62 may include any combination of male and female fastener portions 74 and 76, respectively, such as the combination illustrated in FIG. 6. While ear portions 60, 62 are described as being secured together by the mating male and female fastener portions 74 and 76, respectively, the method of attachment is not intended to be so limited. Alternatively, ear portions 60, 62 may be secured together using other fastening means including, but not limited to, screws, rivets or the like.

As also illustrated in FIG. 6, each ear portion 60, 62 preferably includes at least one post 78 to prevent excessive compression of one ear portion 60, 62 relative to the other after assembly. Post 78 may be positioned proximate fastener 72 to facilitate manufacture of ear portions 60, 62 or, alternatively, may be positioned anywhere within the body of ear 32.

Figure 4:
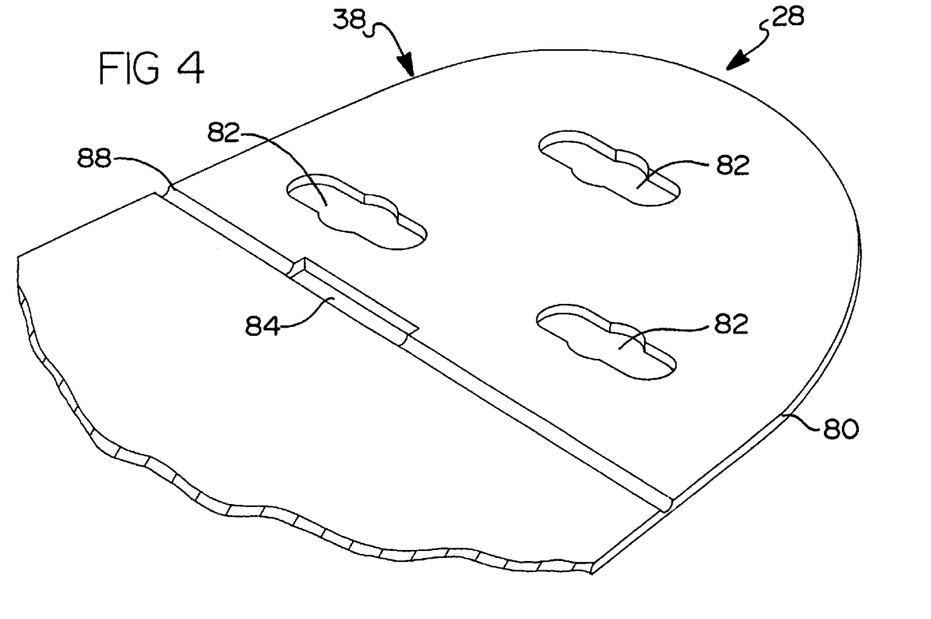
FIG. 4 is a perspective view of one-half of the foundation of FIG. 2.

Referring to FIG. 4 foundation half 38 includes an edge 80 that substantially defines the shape of ear 32. Foundation half 38 includes at least one aperture 82 therethrough that is configured to receive fastener 72 located on mating ear portion 62. Foundation half 38 also includes an aperture 84 for receiving a first interlocking tab 86 that is integrally formed with ear portion 62, as illustrated in FIG. 6. Foundation half 38 is preferably scored along a line 88 proximate aperture 84 to facilitate the initial bending of foundation half 38 once ear 32 is assembled thereto. However, unlike the prior art sun visor foundations that are perforated to facilitate bending of the ear, score line 88 is generally superficial and does not result in the foundation tearing or otherwise failing during repeated movement of ear 32.

Figure 5:
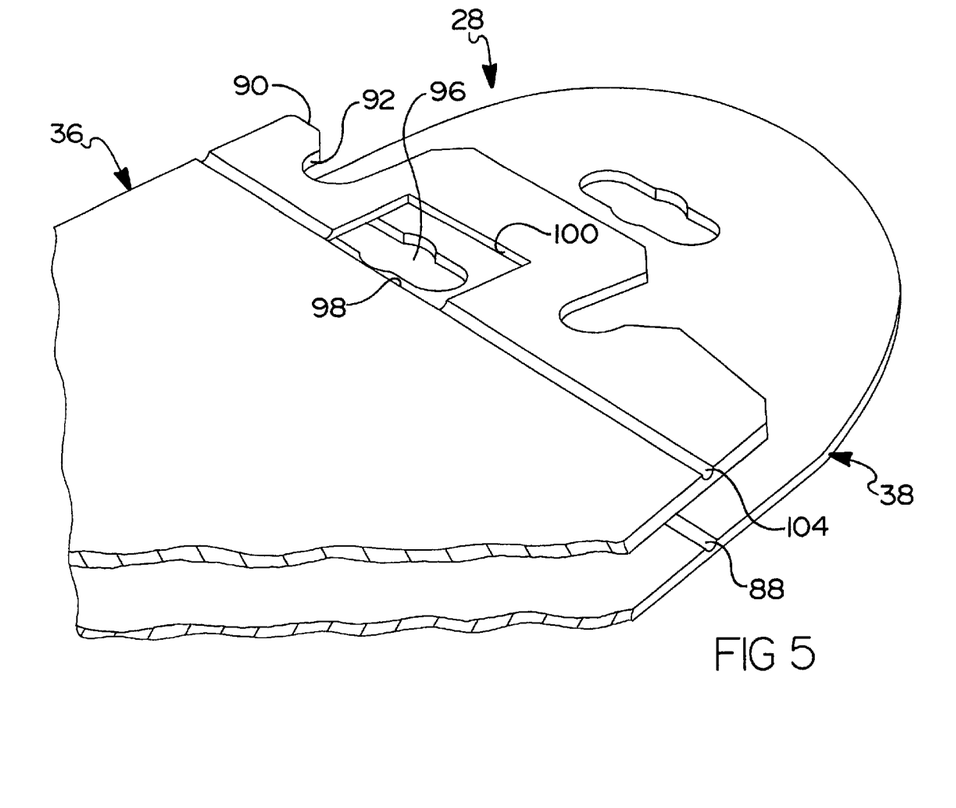
FIG. 5 is a perspective view of the other foundation half overlaying the foundation half of FIG. 4.
Figure 7:
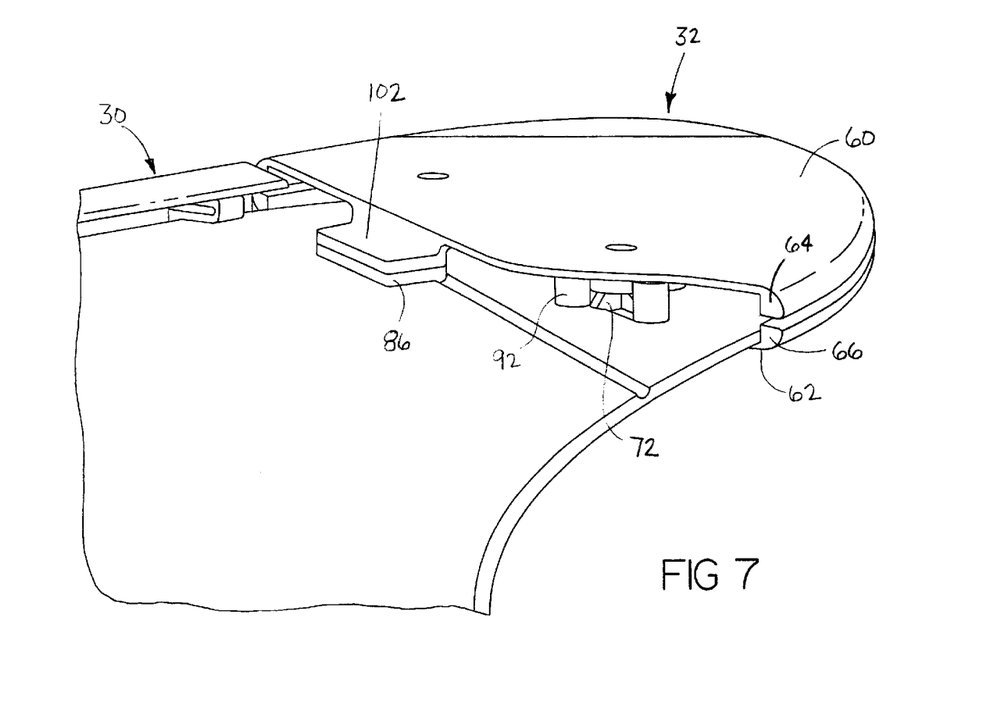
FIG. 7 is a perspective view showing the first ear portion of FIG. 6 mated with a second ear portion.
Figure 8:
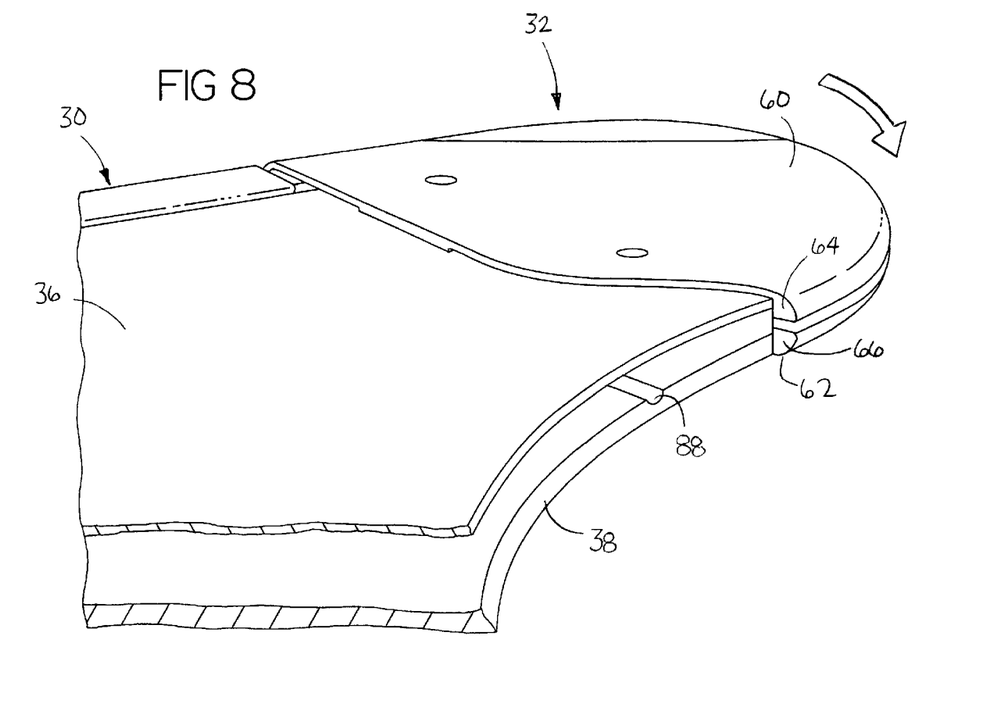
FIG. 8 is a perspective view showing a portion of the assembled sun visor foundation and ear of FIG. 2.

Referring to FIG. 5, the other half 36 of foundation 28 includes an edge 90 that does not define the shape of ear 32. Instead, foundation half 36 includes at least one guide slot 92 that is positioned to receive a tab 94 (shown in FIGS. 3 and 3A) in ear portion 60. Once assembled, tab 94 slides into and out of slot 92 and limits the range of movement of ear 32 in a direction opposite the directional arrow illustrated in FIG. 8. An aperture 96 is also disposed in foundation half 36 and includes an inner edge 98 and an outer edge 100. Aperture 96 is configured to receive a second interlocking tab 102 on ear portion 60, as illustrated in FIG. 7, which is also used to limit the range of travel of ear 32 in the direction indicated by the directional arrow in FIG. 8. Foundation half 36 is preferably scored along a line 104 to facilitate the initial bending of foundation half 36 once assembled. As illustrated in FIG. 8, once assembled, ear 32 is substantially flush with foundation 28 enabling sun visor 20 to exhibit a substantially smooth appearance once cover 34 is applied.

Referring again to FIG. 2, assembly of sun visor body 22 will be described in detail. Preferably, prior to attachment of ear 32 and bead member 30, foundation 28 is folded over a core member or other internal component of sun visor 20, such as a shaft holder or detent (none illustrated), as is known in the art. Ear portion 62 is then assembled onto foundation half 38, enabling male and female fastener portions 74, 76 to extend through apertures 82 and first interlocking tab 86 to extend through aperture 84, as illustrated in FIG. 6. Second ear portion 60 is then assembled onto foundation half 36 by inserting second interlocking tab 102 into aperture 96. Next, upholstery cover 34 is applied over sun visor foundation 28 and ear portions 60, 62. Cover 34 is larger that foundation 28, enabling it to be folded around the respective bulbous portions of bead member 30 and ear portions 60, 62. Cover 34 is then stretched around bulbous portions 64, 66 of ear portions 60, 62 and secured to ear 32 by teeth 70.

Ear portions 60, 62 may then be secured together by interlocking male and female fastener portions 74, 76. Bead member 30 is then assembled onto peripheral edge 42 of foundation halves 36, 38, as is partially illustrated in FIG. 3A, such that the internal components of sun visor assembly 20 are secured substantially within foundation 28. Cover 34 is then stretched around bead member 30 and tucked into gap 52 where it is secured by teeth 54.

Referring to FIGS. 9–15, an alternate embodiment of the present invention is shown in detail. In this embodiment, a sun visor body 210 is provided that includes a foundation 212 having two discrete foundation halves 214, 216. Foundation 212 is preferably formed of a rigid material, such as "SUPERWOOD®," (a registered trademark of Georgia Pacific Corporation) which is a type of hardboard. Hardboard is a preferred foundation material due to its relatively low cost, its relatively high structural integrity and crush resistance, and its ability to be formed in a mold under the influence of pressure, heat and moisture without creasing or tearing. However, foundation 212 may be manufactured out of other materials including, but not limited to, polymers such as ABS and other suitable plastics.

Figure 9:
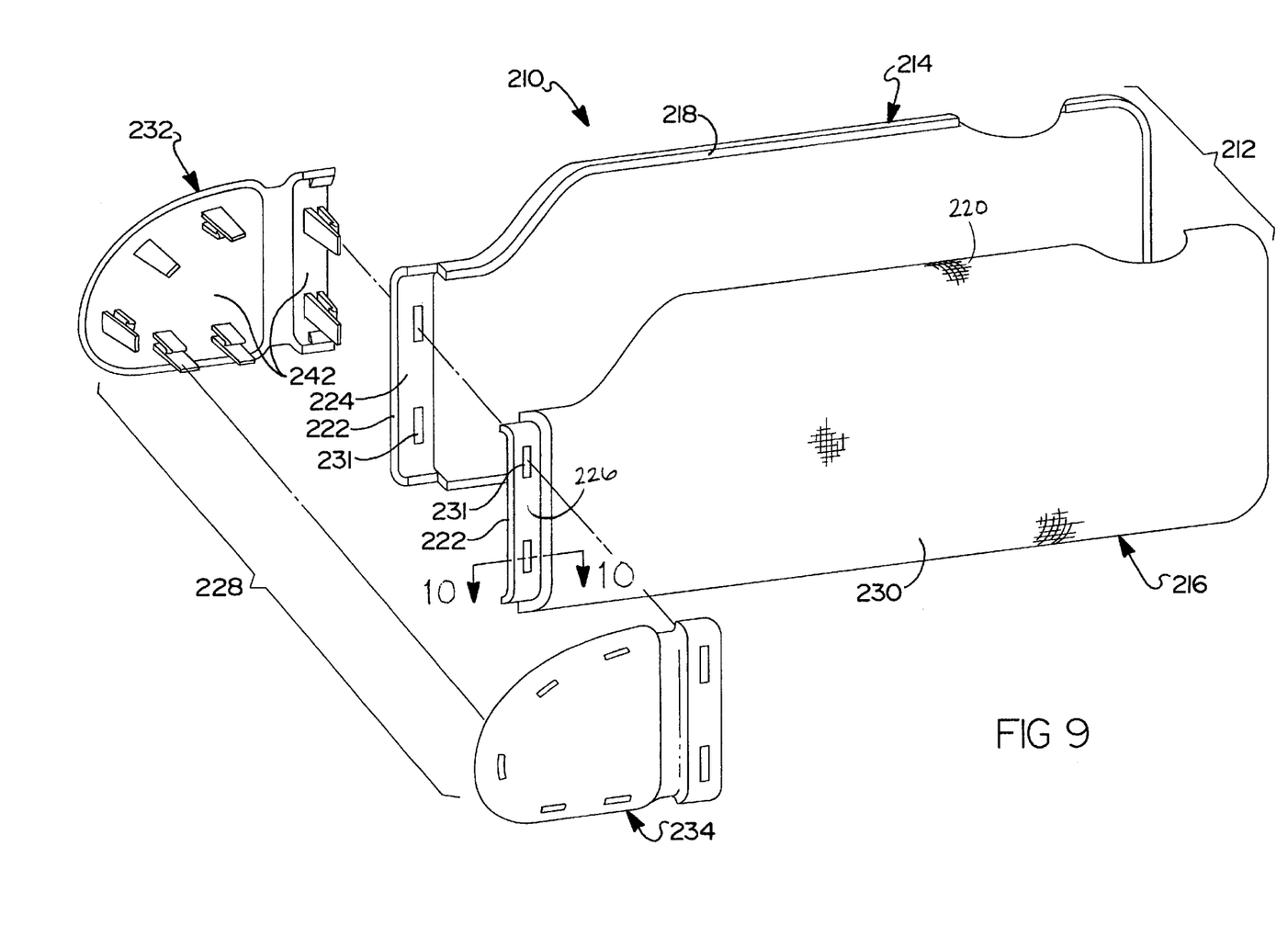
FIG. 9 is an exploded perspective view of a sun visor foundation and ear according to another embodiment of the present invention.
Figure 10:
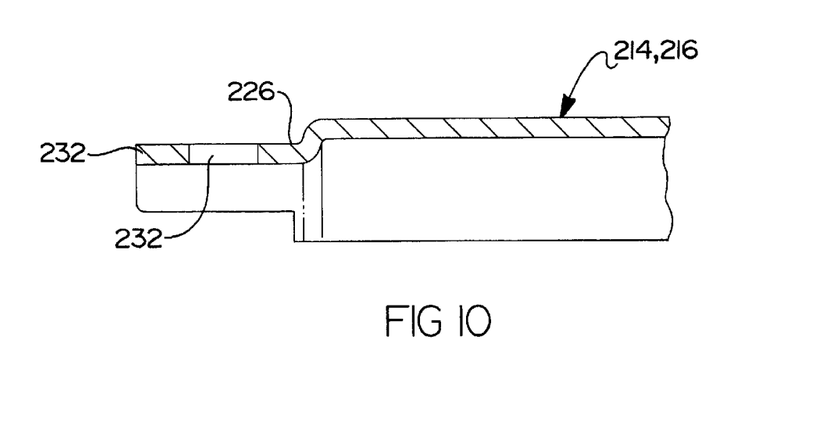
FIG. 10 is a cross sectional view of the sun visor foundation taken along the lines 10—10 in FIG. 9.

At least a portion of a peripheral edge 218 of each foundation half 214, 216 is preferably formed or molded with a rounded lip portion 220. Like bead member 20 described above in the first embodiment, it is preferable that the radius of lip portion 220 be at least 3.2 mm and, more preferably, at least 3.5 mm. When foundation halves 214, 216 are assembled together, lip portions 220 of each foundation half 214, 216 cooperate to form a rounded surface that defines an outer edge of sun visor body 210.

At least one end 222 of each sun visor foundation half 214, 216 does not include lip portion 220, but instead includes an opening 224. The open end 222 of each foundation half 214, 216 includes a recessed portion 226, best seen in FIG. 10, to facilitate attachment of an ear 228. Recessed portion 226 preferably includes at least one aperture 231 therethrough to facilitate attachment of ear 228 to foundation 212, as will be described below. Recessed portion 226 enables ear 228 to be mounted flush with an outer surface 230 of foundation 212.

Ear 228 is provided on a portion of sun visor body 210 that bends when sun visor body 210 is turned upward to its stored position against the vehicle headliner. Ear 228 is preferably made of a polymeric material, such as ABS or other suitable plastic, but may be manufactured of other materials, such as metal. Ear 228 preferably includes two separate ear portions 232 and 234, each having a rounded lip portion 236 and 238, respectively, that cooperate to define an edge of ear 228. The surfaces of lip portions 236, 238, when combined, define a substantially semi-circular cross-section that faces away from sun visor body 210, such that an edge of ear 228 forms a radius. Like lip portion 218 of foundation 212, it is preferable that the radius of lip portions 236 and 238 be at least 3.2 mm and, more preferably, at least 3.5 mm.

Figure 11:
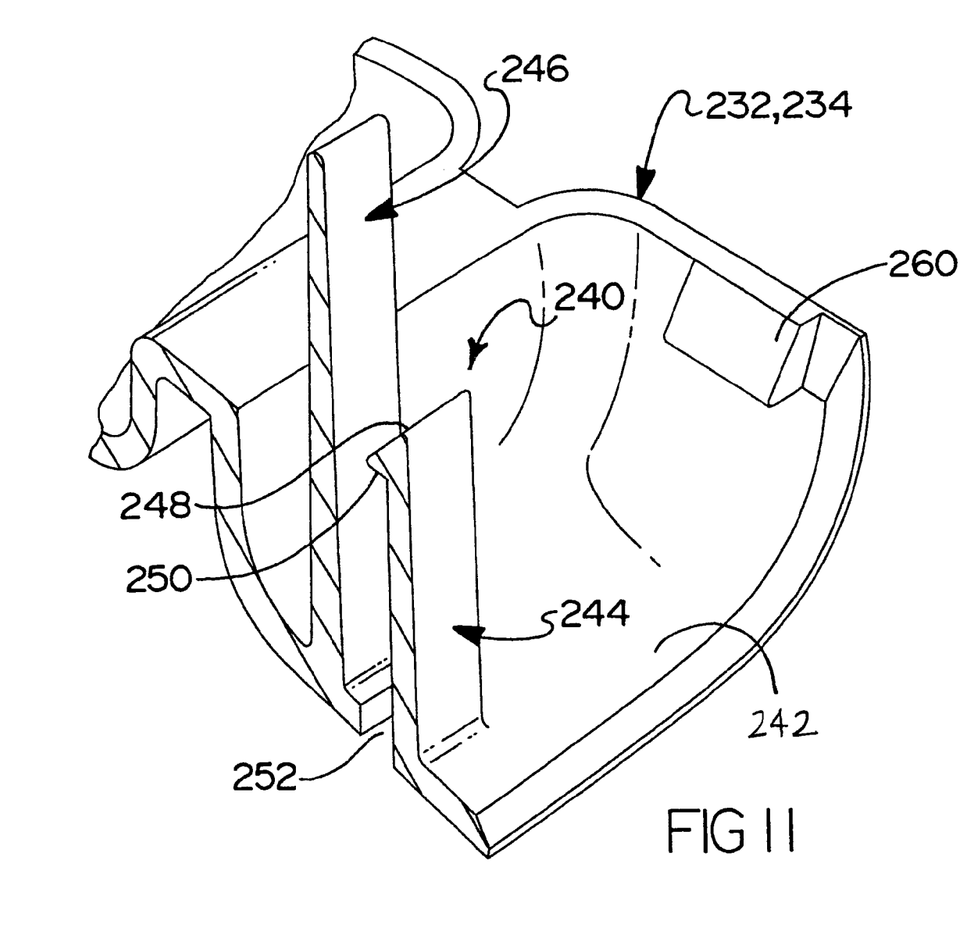
FIG. 11 is a detailed view of one of the ear portions illustrated in FIG. 9.

Referring to FIG. 11, ear portions 232, 234 preferably include at least one integrally formed fastener 240 that extends away from an inner surface 242 of ear portions 232, 234. Fastener 240 is configured to secure ear portions 232, 234 together given a simple movement of one ear portion 232, 234 toward the other. In a preferred embodiment, each fastener 240 includes a catch 244 and a blade 246 positioned proximate catch 244. Each catch 244 includes an elongated body having a tapered ramp 248 that defines a hook 250. Depending on the material properties of ear 228, each catch 244 preferably exhibits a certain degree of resiliency, which allows catch 244 to easily deflect away from blade 246 and readily return to its original "undeflected" position. A hole 252 may be disposed through each ear portion 232, 234 substantially between each catch 244 and blade 246 to permit insertion of a tool, such as a screw driver, between the mating catches 244 to release one catch 244 from another. The number and location of fasteners 240 is generally determined by the shape and size of ear 228. Alternatively, ear portions 232, 234 may be secured together using other fastening means including, but not limited to, screws, rivets and adhesives.

Figure 12:
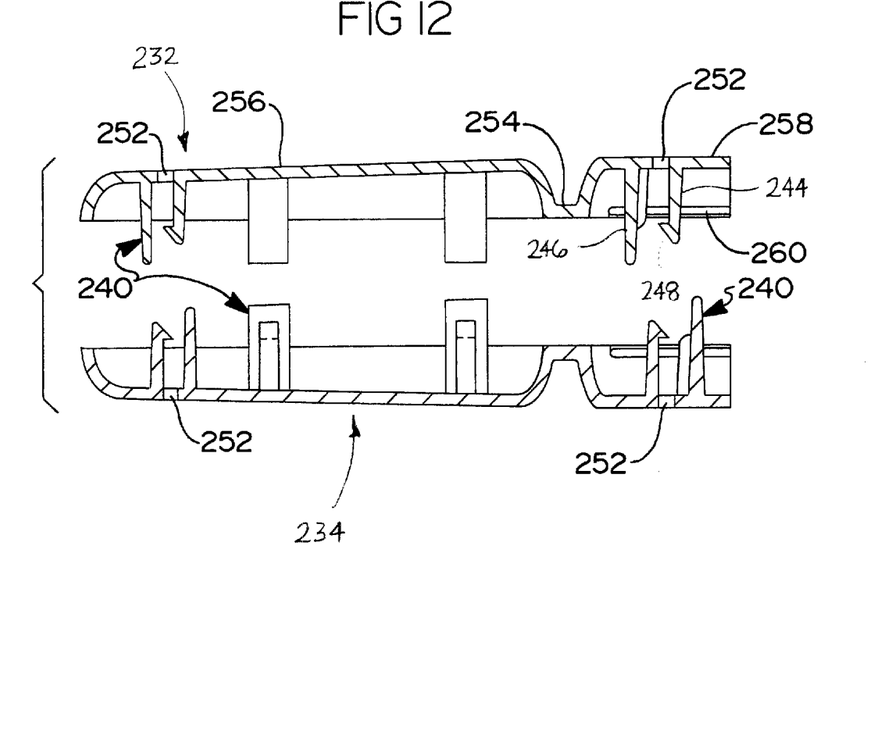
FIGS. 12 and 13 are cross sectional views of the mating ear portions of FIG. 9 prior to and after assembly, respectively.

A cross-sectional view of each ear portion 232, 234 is illustrated in FIG. 12. Each ear portion 232, 234 preferably includes a body 256 and an attachment band 258. A flexible member 254 is disposed between body 256 and attachment band 258 to allow for the repeated bending of body 256 relative to attachment band 258. While flexible member 254 is shown in FIG. 12 as being integrally formed or molded with ear portions 232 and 234, it will be appreciated that flexible member 254 may be separately formed and attached to body 256 and attachment band 258 using an adhesive or other suitable fastening means.

Figure 14:
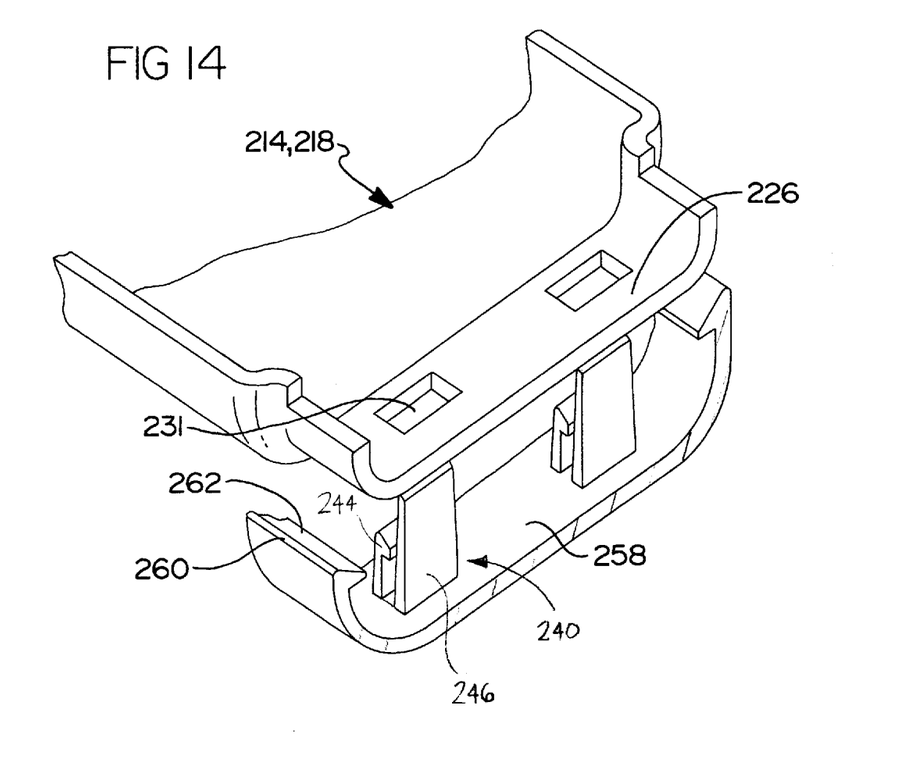
FIG. 14 is a perspective view of a portion of the foundation showing a foundation half and ear portion of FIG. 11 prior to assembly.
Figure 15:
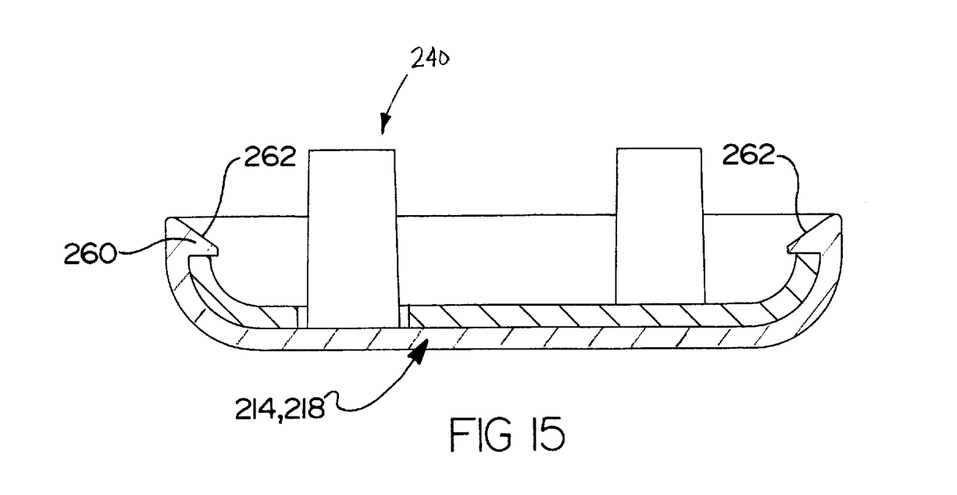
FIG. 15 is a cross-sectional view showing the foundation half and ear portion of FIG. 14 after assembly.

As illustrated in FIGS. 14 and 15, attachment band 258 is received over recessed portion 226 on foundation halves 214, 216. Attachment band 258 preferably includes a pair of catches 260 as well as at least one fastener 240. Catches 260 include a ramped portion 262 that force attachment band 258 to expand as it is inserted onto recess 226 of foundation halves 214, 218. Additionally, apertures 231 in recessed portion 226 receive fasteners 240 on attachment band 258. Once installed onto recessed portion 226, catches 260 snap back to an original "unexpanded" position to retain ear portions 232, 234 on the foundation halves 214, 216. Fasteners 240 on attachment band 258 are used to lock foundation halves 214, 216 together after assembly and serve to prevent ear portions 232, 234 from sliding off recessed portion 226 prior to final assembly.

Referring again to FIGS. 9, 12 and 13 assembly of sun visor 210 will be described in detail. Prior to securing foundation halves 214, 216 together, ear portions 232, 234 are assembled onto recessed portion 226 of their respective foundation half 214, 216 in the manner described above. Upholstery cover 34 cover is then folded around the entire periphery 218 of foundation halves 214, 216, as well as ear portions 232, 234, and glued or otherwise secured to each overlaid component. Next, a core member and/or other internal component, such as a shaft holder or detent (none illustrated), are placed between foundation halves 214, 216 prior to securing foundation halves 214, 216 together.

Figure 13:
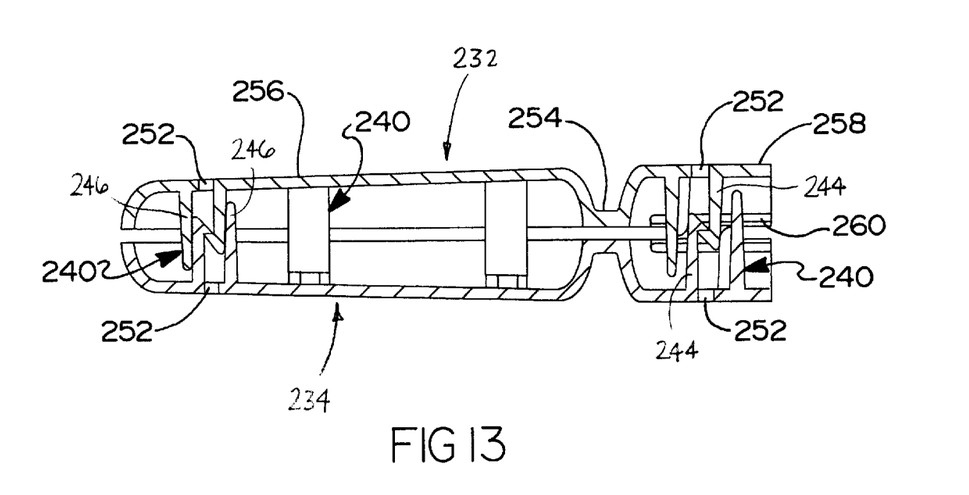

As ear portions 232, 234 are moved toward each other during final assembly, catches 244 on one ear portion engage corresponding catches 244 on the other ear portion. More specifically, ramp 248 of one catch 244 engages ramp 248 of a corresponding catch 244, forcing each catch 244 to deflect away from the other. Upon further movement of ear portions 232, 234 toward one another, each ramp 248 clears its cooperating ramp 248 allowing the corresponding catches 244 to spring back to their original "undeflected" position and interlock. Depending on the internal components provided within foundation 212, foundation halves 214, 216 may be secured together using fasteners or other suitable fastening means known in the art, such as a non-expanding adhesive disposed around periphery 218 of foundation halves 214, 216.

Once assembled, blades 246 adjacent interlocked catches 244 substantially prevent sliding movement of one ear portion 232, 234 relative to the other, and prevent interlocked catches 244 from becoming unlocked. Additionally, in body 256, blades 246 extend across the gap created between assembled ear portions 232, 234 to substantially prevent excessive compression of ear portions 232, 234.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A sun visor assembly comprising:
    a foundation that includes first and second foundation halves, the foundation halves having a periphery that defines at least a portion of an edge of the sun visor assembly;
    a first ear portion attached to the first foundation half; and
    a second ear portion attached to the second foundation half, each ear portion including at least one tab that interlocks the ear portions with a corresponding foundation half, the first and second ear portions secured together to form an ear, wherein at least a portion of the ear is capable of movement relative to the foundation.

2. The sun visor of claim 1, wherein the ear portions comprise a polymeric material.

3. The sun visor of claim 1, wherein the ear portions are secured together by at least one fastener.

4. The sun visor of claim 3, wherein the fasteners are integrally formed with the ear portions.

5. The sun visor of claim 4, wherein each fastener includes a male portion residing on one of the first and second ear portions and a corresponding female portion residing on the other ear portion.

6. The sun visor of claim 4, wherein each fastener includes a pair of mating catches, a portion of each catch configured to mate with a corresponding catch on an opposing ear portion to secure the opposing ear portions together.

7. The sun visor of claim 1, wherein the first ear portion is slidably attached to the first foundation half and the second ear portion to fixedly attached to the second foundation half.

8. The sun visor of claim 1, wherein each ear portion includes a bulbous portion, the bulbous portions cooperating to form a rounded edge having a substantially semi-circular cross-section.

9. The sun visor of claim 1 further including a bead member connected to at least a portion of the periphery of the foundation.

10. The sun visor of claim 9, wherein the bead member includes a pair of bulbous portions, the bulbous portions cooperating to form a rounded edge having a substantially semi-circular cross-section.

11. The sun visor of claim 10, wherein the bulbous portions are connected by a plurality of ribs, the ribs configured to grip the first and second foundation halves to secure the bead member to the foundation.

12. The sun visor of claim 1, wherein the foundation is folded unto itself to form the first and second foundation halves.

13. The sun visor of claim 1, wherein the first and second ear portions are fixedly attached to the first and second foundation halves.

14. The sun visor of claim 1, wherein at least a portion of the periphery of each foundation half includes a lip portion.

15. The sun visor of claim 14, wherein the lip portions cooperate to form a rounded edge having a substantially semi-circular cross-section.

16. The sun visor of claim 1, wherein each foundation half includes a recessed portion that enables a mating ear portion to be mounted substantially flush with an outer surface of the foundation.

17. A sun visor assembly comprising:
   a foundation that includes first and second foundation halves, the foundation halves having a periphery that defines an edge of the sun visor assembly, at least a portion of the periphery of the foundation including a rounded edge having a substantially semi-circular cross-section;
   a first ear portion attached to the first foundation half; and
   a second ear portion attached to the second foundation half, the first and second ear portions secured together to form an ear, at least a portion of the ear capable of movement relative to the foundation where at least a portion of the periphery of each ear portion includes a lip portion that cooperate to form a rounded edge having a substantially semi-circular cross-section.

18. The sun visor of claim 17, wherein a bead member is attached to the foundation.

19. The sun visor of claim 18, wherein the bead member includes a pair of bulbous portions, the bulbous portions cooperating to form the rounded edge of the foundation.

20. The sun visor of claim 19, wherein the bulbous portions are connected by a plurality of ribs, the ribs configured to grip the first and second foundation halves to secure the bead member to the foundation.

21. The sun visor of claim 17, wherein at least a portion of the periphery of each foundation half includes an integrally formed lip portion.

22. The sun visor of claim 21, wherein the lip portions cooperate to form the rounded edge of the foundation.

23. The sun visor of claim 17, wherein the ear portions are secured together by at least one fastener.

24. The sun visor of claim 23, wherein the fastener includes a male portion residing on one of the first and second ear portions and a corresponding female portion residing on the other ear portion.

25. The sun visor of claim 23, wherein each fastener includes a pair of mating catches, a portion of each catch configured to mate with a corresponding catch on an opposing ear portion to secure the opposing ear portions together.

26. A sun visor assembly comprising:
   a foundation that includes first and second foundation halves, the foundation halves having a periphery that defines at least a portion of an edge of the sun visor assembly;
   a first ear portion attached slidably attached to the first foundation half; and
   a second ear portion fixedly attached to the second foundation half, the first and second ear portions secured together to form an ear, wherein at least a portion of the ear is capable of movement relative to the foundation.

27. A sun visor assembly comprising:
   a foundation that includes first and second foundation halves, the foundation halves having a periphery that defines at least a portion of an edge of the sun visor assembly;
   a first ear portion attached to the first foundation half;
   a second ear portion attached to the second foundation half, the first and second ear portions secured together to form an ear, wherein at least a portion of the ear is capable of movement relative to the foundation; and
   wherein each ear portion includes a bulbous portion, the bulbous portions cooperating to form a rounded edge having a substantially semi-circular cross-section.

28. A sun visor assembly comprising:
   a foundation that includes first and second foundation halves, the foundation halves having a periphery that defines at least a portion of an edge of the sun visor assembly;
   a first ear portion attached to the first foundation half;
   a second ear portion attached to the second foundation half, the first and second ear portions secured together to form an ear, wherein at least a portion of the ear is capable of movement relative to the foundation; and
   a bead member connected to at least a portion of the periphery of the foundation.

29. A sun visor assembly comprising:
   a foundation that includes first and second foundation halves, the foundation halves having a periphery that defines at least a portion of an edge of the sun visor assembly, at least a portion of the periphery of each foundation half including a lip portion, the lip portions cooperating to form a rounded edge having a substantially semi-circular cross-section;
   a first ear portion attached to the first foundation half; and
   a second ear portion attached to the second foundation half, the first and second ear portions secured together to form an ear, wherein at least a portion of the ear is capable of movement relative to the foundation.

* * * * *